(12) United States Patent
Garrec (10) Patent No.: US 12,411,473 B2
(45) Date of Patent: Sep. 9, 2025

(54) METHOD FOR CONTROLLING AN ACTUATION ASSEMBLY

(71) Applicant: COMMISSARIAT A L'ENERGIE ATOMIQUE ET AUX ENERGIES ALTERNATIVES, Paris (FR)

(72) Inventor: Philippe Garrec, Gif sur Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 173 days.

(21) Appl. No.: 18/270,798

(22) PCT Filed: Dec. 16, 2021

(86) PCT No.: PCT/EP2021/086084
§ 371 (c)(1),
(2) Date: Jul. 3, 2023

(87) PCT Pub. No.: WO2022/144180
PCT Pub. Date: Jul. 7, 2022

(65) Prior Publication Data
US 2024/0053726 A1    Feb. 15, 2024

(30) Foreign Application Priority Data
Jan. 4, 2021   (FR) ...................................... 2100019

(51) Int. Cl.
*G05B 19/414* (2006.01)
*G05B 19/4103* (2006.01)

(52) U.S. Cl.
CPC ....... *G05B 19/414* (2013.01); *G05B 19/4103* (2013.01); *G05B 2219/41359* (2013.01)

(58) Field of Classification Search
CPC .............. G05B 19/414; G05B 19/4103; G05B 2219/41359; G05B 13/0215; G05B 19/401; B66D 1/12; B66D 1/225; B66D 1/485
(Continued)

(56) References Cited

U.S. PATENT DOCUMENTS 7,236,680 B1 *   6/2007   Jordan ................. G02B 6/4225
                                                       385/52
8,963,898 B2 *   2/2015   Billep ................ G02B 26/0833
                                                       345/204

FOREIGN PATENT DOCUMENTS

FR          2 960 808 A1      12/2011

OTHER PUBLICATIONS

International Search Report for PCT/EP2021/086084 dated, Mar. 14, 2022 (PCT/ISA/210).

* cited by examiner

*Primary Examiner* — David Luo
(74) *Attorney, Agent, or Firm* — Sughrue Mion, PLLC (57) ABSTRACT

A method for controlling an electric actuation assembly with improved accuracy in controlling the torque or force generated. The method includes applying a plurality of known first output forces and recording a plurality of first input intensities for a first movement direction of the output; establishing, by interpolation, a first characteristic function; applying a plurality of second known output torques and recording a plurality of second input currents for a second movement direction of the output opposite to the first direction; establishing, by interpolation, a second characteristic function; establishing, on the basis of the first characteristic function, the second characteristic function, a magnetic constant of the motor and a reduction ratio of a
(Continued)

gearbox, and a control correction coefficient; and controlling the actuation assembly by applying the control correction coefficient.

5 Claims, 6 Drawing Sheets

(58) Field of Classification Search
USPC .......................................... 318/569, 567, 560
See application file for complete search history.

Fig. 1

| $C_{sd}$ | $C_{d1}$ | $C_{d2}$ | $C_{d3}$ | $C_{d4}$ | $C_{d5}$ |
|---|---|---|---|---|---|
| $I_e$ | $I_{d1}$ | $I_{d2}$ | $I_{d3}$ | $I_{d4}$ | $I_{d5}$ |

~30

| $C_{si}$ | $C_{i1}$ | $C_{i2}$ | $C_{i3}$ | $C_{i4}$ | $C_{i5}$ |
|---|---|---|---|---|---|
| $I_e$ | $I_{i1}$ | $I_{i2}$ | $I_{i3}$ | $I_{i4}$ | $I_{i5}$ |

| $C_{sd}$ | $C_{d1}$ | $C_{d2}$ | $C_{d3}$ | $C_{d4}$ | $C_{d5}$ |
|---|---|---|---|---|---|
| $I_e$ | $\lambda I_{d1}$ | $\lambda I_{d2}$ | $\lambda I_{d3}$ | $\lambda I_{d4}$ | $\lambda I_{d5}$ |

| $C_{si}$ | $C_{i1}$ | $C_{i2}$ | $C_{i3}$ | $C_{i4}$ | $C_{i5}$ |
|---|---|---|---|---|---|
| $I_e$ | $\lambda I_{i1}$ | $\lambda I_{i2}$ | $\lambda I_{i3}$ | $\lambda I_{i4}$ | $\lambda I_{i5}$ |

| $C'_{sd}$ | $C'_{sd1}$ | $C'_{sd2}$ | $C'_{sd3}$ | $C'_{sd4}$ | $C'_{sd5}$ |
|---|---|---|---|---|---|
| $C'_{ed}$ | $C'_{ed1}$ | $C'_{ed2}$ | $C'_{ed3}$ | $C'_{ed4}$ | $C'_{ed5}$ |

Fig. 7

| $C'_{si}$ | $C'_{si1}$ | $C'_{si2}$ | $C'_{si3}$ | $C'_{si4}$ | $C'_{si5}$ |
|---|---|---|---|---|---|
| $C'_{ei}$ | $C'_{ei1}$ | $C'_{ei2}$ | $C'_{ei3}$ | $C'_{ei4}$ | $C'_{ei5}$ |

METHOD FOR CONTROLLING AN ACTUATION ASSEMBLY

CROSS REFERENCE TO RELATED APPLICATIONS

This application is a National Stage of International Application No. PCT/EP2021/086084 filed Dec. 16, 2021, claiming priority based on French Patent Application No. 2100019 filed Jan. 4, 2021.

The present invention relates to the field of actuators, and more specifically, controlling actuators comprising a mechanical gearbox.

BACKGROUND OF THE INVENTION

It is known to control the rotation of an hinge using an electric actuation assembly managed by a control unit. Such an assembly generally comprises a current controller connected to an actuator constituted of a motor coupled with a gearbox, the rotary output of which actuates the hinge. For partial or total balancing applications of a mass to be handled, it is common to control the actuation assembly such that it exerts an output torque. To do this, the control unit determines an intensity setpoint which is sent to the current controller. The current controller thus applies a current with an intensity equal to the intensity setpoint to the motor which generates a motor torque. This motor torque is applied to the input of the gearbox which produces an output torque. The setpoint current is generally determined by dividing a motor torque target value, determined according to the characteristics of the setpoint gearbox, by the electromagnetic constant of the motor which proportionally links the motor torque and the intensity applied according to a relationship of the form:

$$Cmot = K * Imot$$

Where:
Cmot is the motor torque
Imot is the intensity applied at the input of the motor
K is the electromagnetic constant of the motor provided by the manufacturer of the motor.

The electromagnetic constant of the motor provided by the producers is generally not very accurate to be usable in open loop applications for which the controlling of the output torque is significant, such as remotely-operated or master force amplification applications (cobots).

Finally, an uncertainty of the current controller can also be noted between the value of the setpoint current that it receives and the value of the setpoint current that it generates. Indeed, the value of the setpoint current generated by the current controller can vary from one current controller specimen to the other, vary over time or depend on the temperature, for example.

These inaccuracies make difficult the use of such actuation systems in applications which require a great accuracy in the output forces applied.

Finally, the difference between the characteristic linking the input signal (electric intensity or mechanical torque) and the output torque according to the output of the actuator moved in one direction or in the other, contributes to the inaccuracy of the balancing of such an actuator.

AIM OF THE INVENTION

The invention aims, in particular, to improve the accuracy in controlling the torque or the force generated by an actuation system.

SUMMARY OF THE INVENTION

To this end, a method for controlling an electric actuation assembly is provided, comprising a current controller connected to an actuator, the actuator comprising a motor coupled with a gearbox having a known reduction ratio, the actuation assembly being provided with an output. The method comprising the following steps:
applying a plurality of first known output forces on the output of the actuation assembly and recording, using the current controller, a plurality of first input intensities associated with applying, at the input of the actuation assembly to obtain a balance of the actuation assembly in a first movement direction of the output;
establishing, by interpolation, a first characteristic function of the actuation assembly linking a controlled intensity at the input of the actuation assembly and a force obtained at the output of the actuation assembly;
applying a plurality of second known output forces on the output of the actuation assembly and recording, using the current controller, a plurality of second input intensities associated with applying, at the input of the actuation assembly, to obtain a balance of the actuation assembly in a second movement direction of the output opposite to the first direction;
establishing, by interpolation, a second characteristic function of the actuation assembly linking a controlled intensity at the input of the actuation assembly and a force obtained at the output of the actuation assembly;
establishing, on the basis of the first characteristic function of the actuation assembly, of the second characteristic function of the actuation assembly of a magnetic constant of the motor and of the reduction ratio of the gearbox, a control correction coefficient;
controlling the actuation assembly by applying the control correction coefficient.

Thus, a control method is obtained, which mainly considers all of the uncertainties relating to the current controller and to the value of the magnetic constant of the motor, and considering the movement direction of the output of the gearbox. It is thus not necessary to perform distinct calibrations of the motor, of the gearbox and of the current controller, which makes it possible to save time and money during the implementation or the replacement of an actuation assembly.

The method is particularly indicated for linear transfer diagram actuators when the first characteristic function is a linear function which is written in the form $$Csd(Ie) = a1 * Ie + b1$$

Where:
a1 and b1 are constants determined by interpolation,
Csd is the force obtained at the output of the actuation assembly for a movement of the output in the first direction,
Ie is an intensity applied at the input of the actuation assembly.

The second characteristic function is thus a linear function which is written in the form $$Csi(Ie) = a2 * Ie + b2$$

Where:
a2 and b2 are constants determined by interpolation,
Csi is the force obtained at the output of the actuation assembly for a rotation of the output in the second direction, Ie is an intensity applied at the input of the actuation assembly, the step of establishing a control correction coefficient comprises the calculation of the correction coefficient as follows:

$$\lambda = \frac{i^{-1} * \sqrt{B^{-1} * (a1 * a2)}}{K} \quad \text{[Math 1]}$$

Where:

B is a skewness coefficient which is calculated as follows:

$$B = \frac{Rd}{Ri} \quad \text{[Math 2]}$$

with

Rd: theoretical yield of the gearbox when the output charge of the gearbox is resistant;

Ri: theoretical yield of the gearbox when the output charge of the gearbox is motive;

i is the reduction ratio

K is the electromagnetic constant

The control method has a particularly interesting application for actuators comprising a first gearbox comprising a strain wave gearing defined by first construction parameters which comprise a first deformable outer ring shape, a first number of deformable outer ring teeth, a first toothing profile, a second number of inner ring teeth. The method comprises a preliminary calibration step comprising the following steps:

selecting a second gearbox defined by second construction parameters identical to the first construction parameters;

establishing a third characteristic function of the second gearbox linking a force applied at the input of the second gearbox and a force obtained at the output of the second gearbox for a movement of an output of the second gearbox in a third direction;

establishing a fourth characteristic function of the second gearbox linking a force applied at the input of the second gearbox and a force obtained at the output of the second gearbox for a movement of an output of the second gearbox in a fourth direction opposite to the third direction;

determining a plurality of pairs of values such that:

$$x1-(1/i)*F3(x1)=F4(x2)-i*x2$$

wherein x1 is a first abscissa x2 is a second abscissa i is the reduction ratio

F3 (x1) is the third characteristic function;

F4 (x2) is the fourth characteristic function;

interpolating a fifth function for determining the second abscissa according to the first abscissa in the form of a polynomial function of degree 2 being written:

$$x2=\alpha*x1^2+\beta*x1+\gamma,$$

Where $\alpha$, $\beta$ and $\gamma$ are constants determined by interpolation, the first characteristic function being established in the form of a polynomial function of degree 2 which is written in the form $$Csd(Ie)=a'1*Ie^2+b'1*Ie+c'1$$

Where:

a'1, b'1 and c'1 are constants determined by interpolation;

Csd is the force obtained at the output of the actuation unit for a movement of the output of the second gearbox in the third direction, Ie is an intensity applied at the input of the actuator, the second characteristic function being established in the form of a polynomial function of degree 2 which is written in the form $$Csi(Ie)=a'2*Ie^2+b'2*Ie+c'2$$

Where:

a'2, b'2 and c'2 are constants determined by interpolation;

Csi is the force obtained at the output of the actuation unit for a movement of the output of the second gearbox in the fourth direction, Ie is a current applied at the input of the actuator, the step of establishing a control correction coefficient comprises a step of adjusting the control coefficient so as to minimise the following sum of squares of deviations between the sixth and the seventh function:

$$F6(X) = a'2 * X^2 + b'2 * X + c'2 \quad \text{[Math 3]}$$

$$F7(X) = \left(\lambda * i - \alpha^{-1} * \lambda^{-1} * a'1\right) * X + \quad \text{[Math 4]}$$
$$0.5 * \alpha^{-1} * \left(i + \alpha^{-1} * \beta * \lambda^{-2} * a'1 - \lambda^{-1} * b'1\right) *$$
$$\left(\sqrt{\beta^2 - 4 * \alpha * (\gamma - \lambda * X)} - \beta\right) + \alpha^{-1} * \lambda^{-2} * a'1 * \gamma - c'1$$

Where: i is the reduction ratio $\lambda$ is the control input correction coefficient.

Advantageously, the method described above is applied, both when the actuator is a rotary output actuator and when the actuator is a linear output actuator.

Other features and advantages of the invention will emerge upon reading the description below of a particular embodiment/a particular and non-limiting/limiting implementation of the invention.

BRIEF DESCRIPTION OF THE DRAWINGS

Reference will be made to the accompanying drawings, among which.

DETAILED DESCRIPTION OF THE INVENTION

In reference to FIGS. 1 to 4, the control method according to the invention will be described in application to an actuation assembly generally referenced 1 and which comprises a digital servoamplifier 2 which is connected, on the one hand, to a current source 3 and, on the other hand, to an input 4 of an actuator 10. The servoamplifier 2 comprises a keypad 5 to enter a current setpoint and a setpoint display screen 6. The servoamplifier 2 also comprises an auxiliary socket making it possible to connect the servoamplifier 2 to a microcomputer-type electronic control unit 8.

Figure 1:
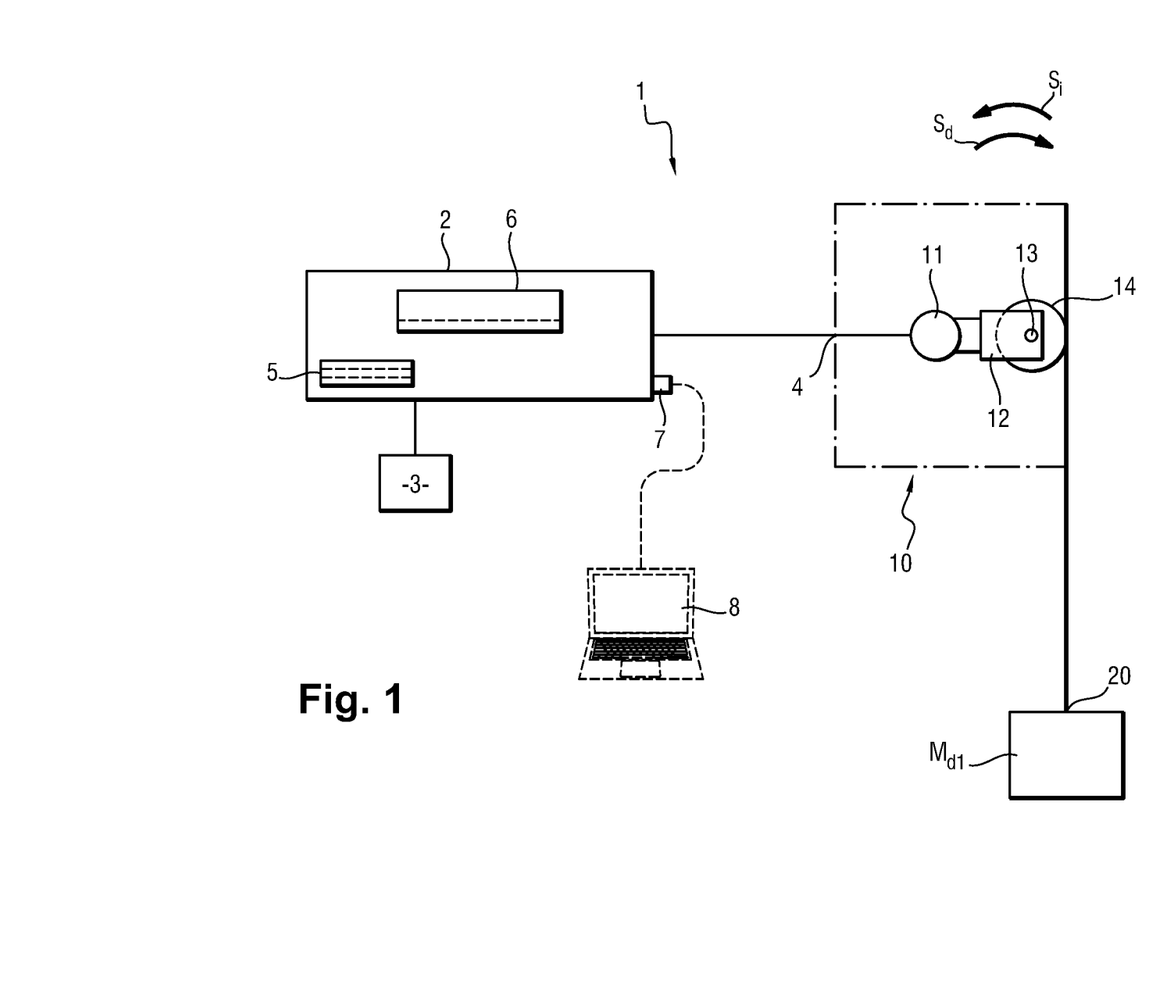
FIG. 1 is a schematic representation of an actuation assembly according to a first embodiment of the invention.

The actuator 10 comprises a motor 11 connected to a gearbox 12, the rotary output 13 of which is connected to a drum 14. As is generally the case, the motor 11 and the gearbox 12 are delivered already assembled in the form of an assembly also called "geared motor". The motor 11 has an indicative electromagnetic constant $K_{11}$ and the gearbox 12 is, according to a first embodiment of the invention, a linear transfer characteristic gearbox, in this case, a gear train gearbox, of known reduction ratio i.

According to a first step of the method, a first known mass Md1 is applied at the end 20 of a cable 21 wound over the drum 14. The input intensity of the servoamplifier 2 is then adjusted to obtain a balance of the actuation unit 1, namely a movement of the output 13 in a first direct direction Sd (in this case, a clockwise direction according to the representation of FIG. 1) at a constant speed considered as low. A speed is considered as low in the sense of the patent application, when it is less than or equal to a top speed above which the speed starts to have a detectable impact on the friction. By definition, below this speed, the friction only depends on the charge on the parts which are movable in contact (therefore, on the force transmitted). Typically, a speed is considered low when it is less than 10% of the nominal speed of the gearbox. The first direct direction corresponds, in this case, to an energy transfer of the motor 11 to the charge (first mass Md1). The first input intensity Id1 corresponding to the mass Md1—i.e. to a known torque Cd1—is recorded.

Figure 2:
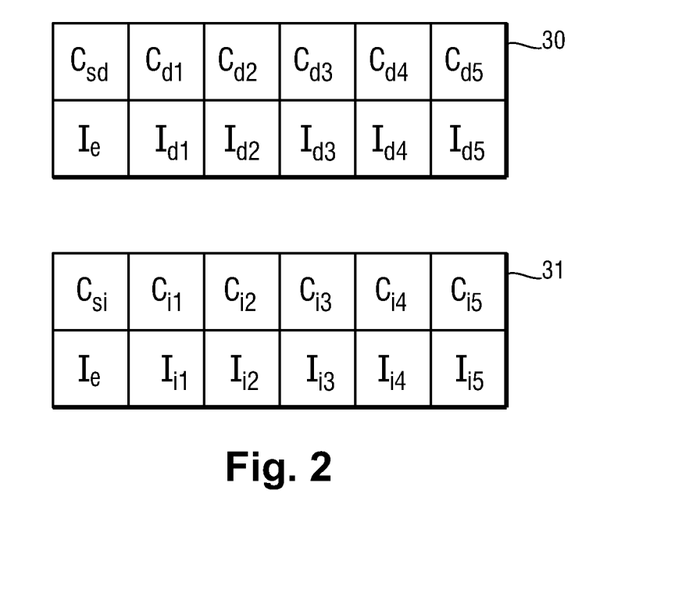
FIG. 2 is a schematic representation of a first table and a second table of output torque values of the actuation assembly of FIG. 1 according to an input intensity.

The first step is repeated with different first masses Md2, Md3, Md4 and Md5. The first intensities Id2, Id3, Id4 and Id5 associated with the torques Cd2, Cd3, Cd4 and Cd5 are recorded. Thus, a first table 30 is obtained, giving the output torque Csd in the direct direction according to an input intensity read on the servoamplifier 2.

Figure 3:
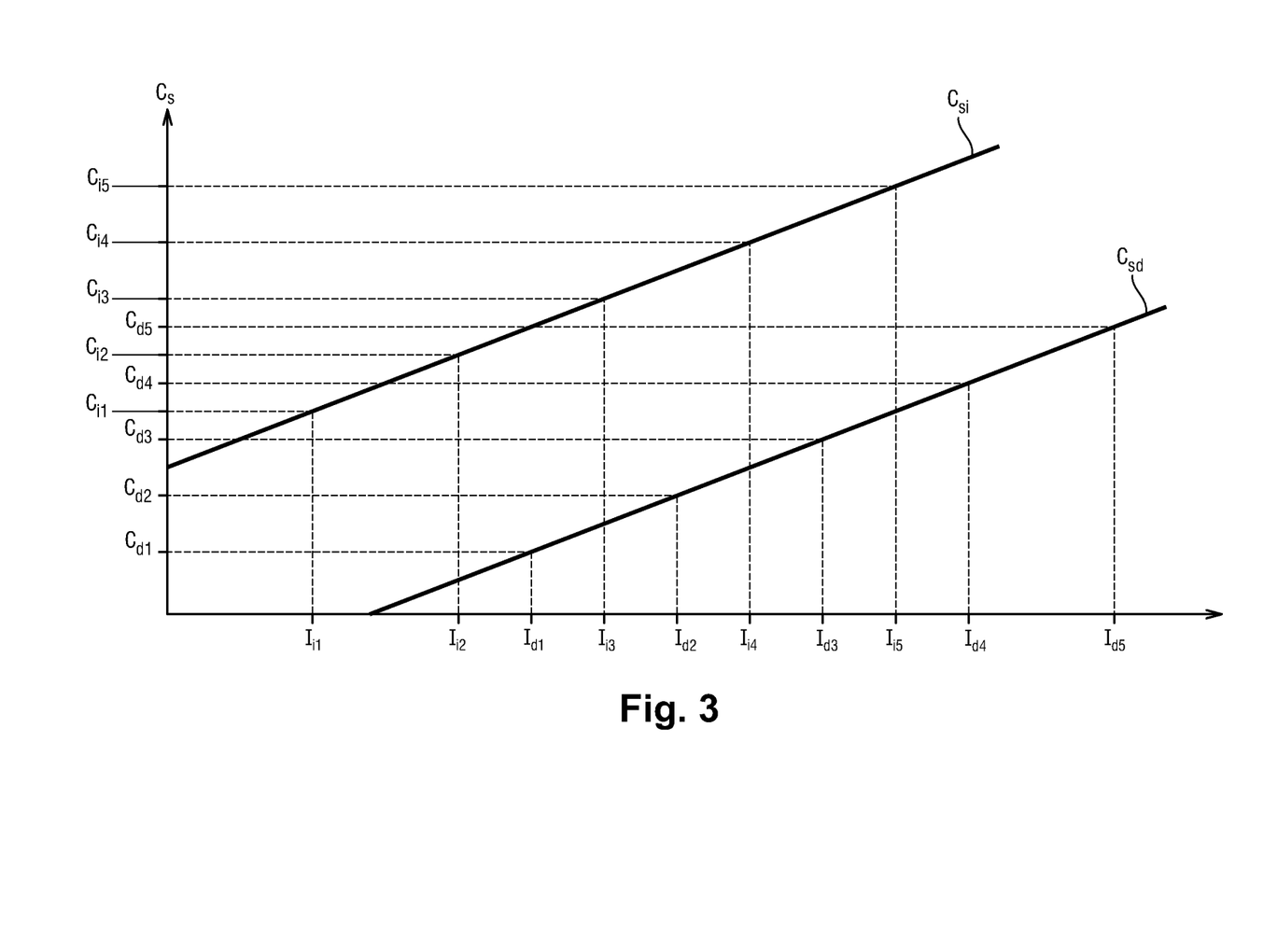
FIG. 3 is a schematic representation of a transfer diagram of the actuation assembly of FIG. 1.

According to a second step, and using known interpolation methods, a first direct characteristic interpolated function Csd is established on the basis of first input intensities Id1 to Id5 and of first output torques Cd1 to Cd5 (FIG. 3).

In the case of a linear transfer characteristic actuator, the first direct characteristic interpolated function Csd can be written in the form of a linear function, as follows:

$$Csd(Ie) = a1*Ie + b1 \qquad (1)$$

Where:
a1 and b1 are constants determined by interpolation,
Csd is the torque obtained at the output 13 of the actuator 10 in the direct direction,
Ie is an intensity applied at the input of the actuator and measured by the servoamplifier 2.

The third step of the method of the invention is similar to the first step, as it comprises the application of second known masses Mi1 to Mi5 at the end 20 of the cable 21 and the measurement of the input intensities of the servoamplifier 2 required to obtain a balance of the actuation unit 1, namely a movement of the output 13 in a second indirect direction Si (in this case, an anticlockwise direction according to the representation of FIG. 1) at a constant speed considered as low. The first input intensities Ii1 to Ii5 corresponding to the second masses Mi1 to Mi5—i.e. to known torques Ci1 to Ci5—are recorded. Thus, a second table 31 is obtained, giving the output torque Csi in the indirect direction according to an input intensity read on the servoamplifier.

According to a fourth step, and using known interpolation methods, a second indirect characteristic interpolated function Csi is established on the basis of second input intensities Ii1 to Ii5 and second output torques Ci1 to Ci5 (FIG. 3).

In the case of a linear transfer characteristic actuator, the second indirect characteristic interpolated function Csi can be written in the form of a linear function, as follows:

$$Csi(Ie) = a2*Ie + b2$$

Where:
a2 and b2 are constants determined by interpolation,
Csi is the torque obtained at the output of the actuator in the indirect direction,
Ie is an intensity applied at the input of the actuator, According to a fifth step, a correction coefficient is calculated as follows:

$$\lambda = \frac{i^{-1} * \sqrt{B^{-1} * (a1*a2)}}{K_{11}} \qquad [\text{Math 1}]$$

Where:
B is a skewness coefficient which is calculated as follows:

$$B = \frac{Rd}{Ri} \qquad [\text{Math 2}]$$

with
Rd: theoretical yield of the gearbox when the output charge of the gearbox is resistant;
Ri: theoretical yield of the gearbox when the output charge of the gearbox is motive;
i is the reduction ratio of the first gearbox 12
$K_{11}$ is the electromagnetic constant indicative of the motor 11
$\lambda$ is the control input correction coefficient.

As an example, a gearing gearbox has a skewness coefficient B which is equal to 1. In the case of a gearbox comprising a screw/nut assembly, the skewness coefficient B is written as follows:

$$B = \frac{Rd}{Ri} = \frac{\frac{(1 - \mu * \tan\alpha')}{(1 + \mu * \tan^{-1}\alpha')}}{\frac{(1 - \mu * \tan^{-1}\alpha')}{(1 + \mu * \tan\alpha')}} \qquad [\text{Math 5}]$$

Figure 4:
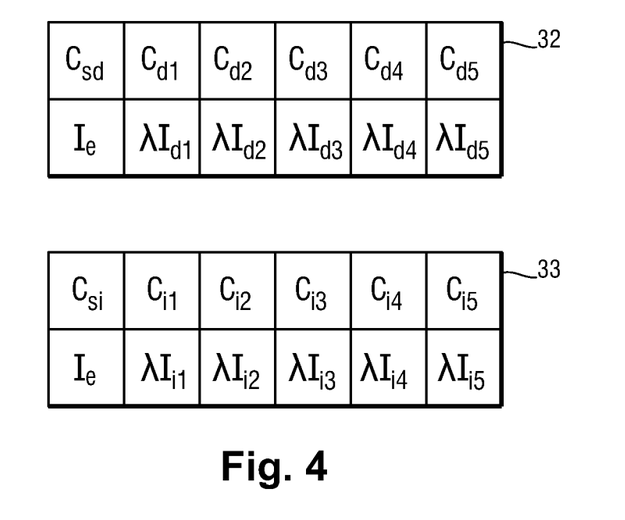
FIG. 4 is a schematic representation of a third table and a fourth table of output torque values of the actuation assembly of FIG. 1 according to a corrected input intensity.

With
μ: the sliding friction coefficient of the pair of materials of the screw and of the nut, or the bearing friction coefficient for a ball screw or roller screw;
α': the thread angle of the screw/nut assembly According to a sixth step, a first direct corrected characteristic F1 is established. To do this, the intensities appearing in the first table 30 are corrected, by multiplication by the control input correction coefficient λ. A third corrected table 32 is obtained, which matches input intensity values applied by the servoamplifier 2 with an output torque Csd in the direct direction. It is thus possible to control the application of an accurate output torque of the actuation assembly 1 by the application of a determined current value. The correction made on the input axis makes it possible to have a more accurate direct direction corrected characteristic. The inaccuracies linked to the value of the electromagnetic constant $K_{11}$ and to the inaccuracies of the servoamplifier 2 are compensated for by the control input correction coefficient λ. Thus, by using the first direct correct characteristic F1, it is possible to accurately associate an input intensity value with a balance torque applied at the output of the actuation assembly 1, and reciprocally.

According to a seventh step, a first indirect corrected characteristic F2 is established. To do this, the intensities appearing in the second table 31 are corrected, by multiplication by the control input correction coefficient λ. A fourth corrected table 31 is obtained, which matches input intensity values applied by the servoamplifier 2 with an output torque Csd in the indirect direction.

According to an eighth step, the first direct corrected characteristic F1 and the second indirect corrected characteristic F2 are utilised to control the actuation assembly 1, for example to compensate for the friction resulting from the charge and to obtain a quasi-proportional torque amplification law. According to a preferred embodiment, the first direct corrected characteristic F1 and the second indirect corrected characteristic F2 are entered into the control unit 8.

The elements identical or similar to those described above will have a numerical reference identical to that in the description below of a second embodiment of the invention.

Figure 5:
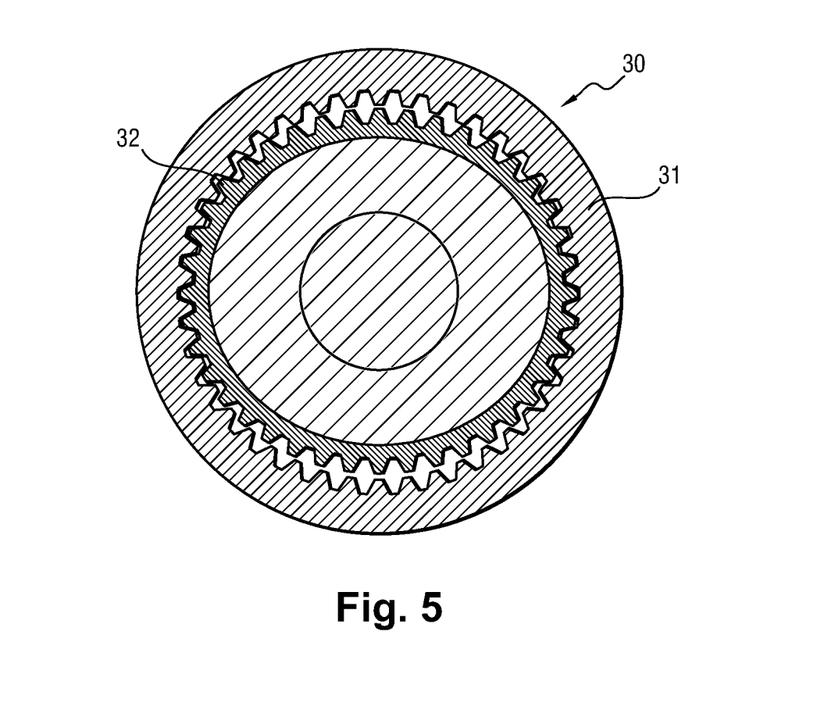
FIG. 5 is a schematic representation of a second strain wave gearing gearbox according to a second embodiment of the invention.

According to a second embodiment of the invention, the first gearbox 12 comprises a strain wave gearing 30. The gearing 30 comprises a outer ring 31 comprising a first number of teeth Z31 having a first toothing profile. The gearing 30 comprises an inner ring 32 having a second number of teeth Z32. The first number of teeth Z31, the second number of teeth Z32 and the first toothing profile define the first construction parameters of the first gearbox 12.

Figure 6:
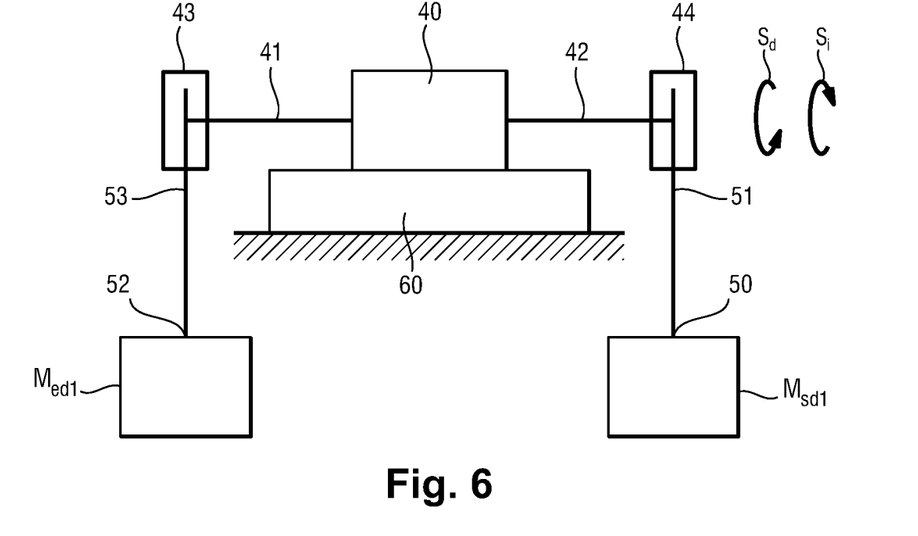
FIG. 6 is a schematic representation of a test bench.

According to a first step of a preliminary calibration phase, a second gearbox 40 defined by second construction parameters identical to the first construction parameters (same strain gearing form, same toothing profile, same number of inner ring teeth, same number of outer ring teeth) is placed on a test bench 60. The input shaft 41 and the output shaft 42 of the second gearbox 40 are respectively provided with an input drum 43 and an output drum 44.

According to a second step of the preliminary calibration phase, a third known mass M'ds1 is applied at the end 50 of a cable 51 wound over the output drum 44. The fourth mass M'de1 to be applied to the end 52 of a cable 53 wound over the input drum 43 is thus experimentally determined, to obtain a balance of the second gearbox 40, namely a rotation of the output shaft 42 in a first direct direction Sd at a constant speed considered as low. The fourth direct input torque C'de1 generated by the fourth input mass M'ed1 and which corresponds to the third mass M'sd1 (that is a third direct output torque C'ds1) is recorded.

Figure 7:
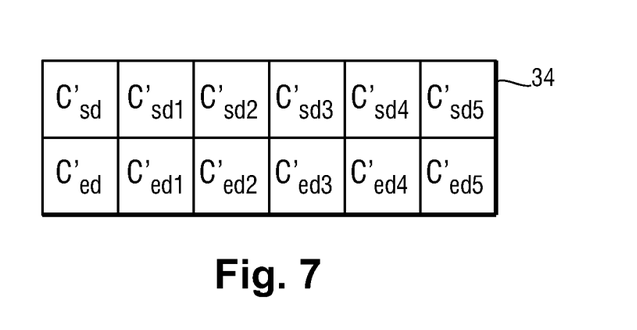
FIG. 7 is a schematic representation of a fifth table of output torque values for a first movement direction of the output of an actuation assembly according to a second embodiment of the invention according to an input intensity.

According to a third step of the preliminary calibration phase, the second step of the preliminary calibration phase is repeated with different third masses M'sd2, M'sd3, M'sd4 and M'sd5. The fourth direct input torques C'ed2, C'ed3, C'ed4 and C'ed5 associated with the third direct output torques C'sd2, C'sd3, C'sd4 and C'sd5 are recorded. Thus, a fifth table 34 is obtained, giving the third output torque C'sd in the direct direction according to a fourth input torque C'ed (FIG. 7).

According to a fourth step of the preliminary calibration phase, a third direct characteristic interpolated function F3 of the second gearbox 40 linking a torque C'ed applied at the input of the second gearbox 40 and a torque C'sd obtained at the output of the second gearbox 40 for a first direct direction Sd is established, based on the information from the fifth table 34.

Figure 8:
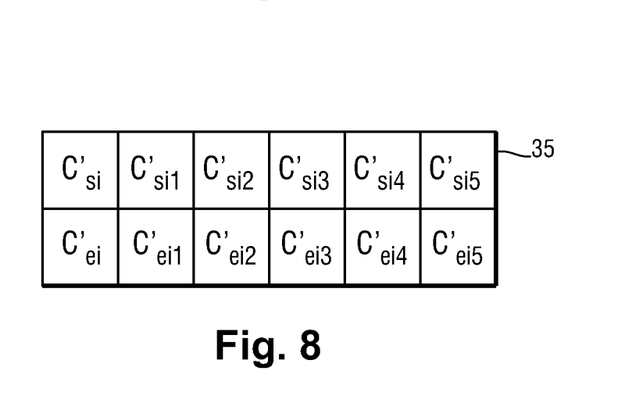
FIG. 8 is a schematic representation of a sixth table of output torque values for a second movement direction of the output of an actuation assembly according to a second embodiment of the invention according to an input intensity.

According to a fifth step of the preliminary calibration phase, homologously and for an indirect rotation direction Si of the output shaft 42 opposite to the direct direction Sd, a sixth table 35 is established by measurement, which associates fifth indirect output torques C'si1, C'si2, C'si3, C'si4 and C'si5 with sixth indirect input torques C'ei2, C'ei3, C'ei4 and C'ei5 (FIG. 8).

According to a sixth step of the preliminary calibration phase, a fourth indirect characteristic interpolated function F4 of the second gearbox 40 linking a torque C'ei applied at the input of the second gearbox 40 and a torque C'si obtained at the output of the second gearbox 40 for a second indirect direction Si opposite to the first direct direction Sd is established, based on the information from the sixth table 35.

According to a seventh step of the preliminary calibration phase, a plurality of torques is determined, of values such that:

$$x1-(1/i)*F3(x1)=F4(x2)-i*x2$$

wherein
x1 is a first direct abscissa
x2 is a second indirect abscissa
i is the first reduction ratio, identical to the second reduction ratio of the second gearbox 40.
F3(x1) is the third direct characteristic interpolated function;
F4(x2) is the fourth indirect characteristic interpolated function.

Figure 9:
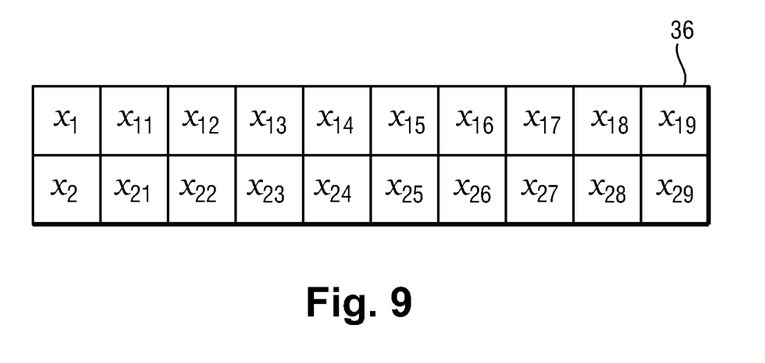
FIG. 9 is a schematic representation of a seventh table of first abscissa values according to the second indirect abscissa.

Thus, a seventh table 36 is obtained, giving the first direct abscissa x1 according to the second indirect abscissa x2 (FIG. 9).

According to an eighth step of the preliminary calibration phase, a fifth interpolated function for determining the second indirect abscissa x2 according to the first direct abscissa x1 is established, based on the information from the seventh table 36, in the form of a polynomial function of degree 2 being written:

$$X2=\alpha*x1^2+\beta*x1+\gamma,$$

Where α, β and γ are constants determined by interpolation.

The reproduction of the first and second steps of the method according to the first embodiment described above makes it possible to establish the first direct function interpolated function Csd in the form of a polynomial function of degree 2 which is written in the form $$Csd(Ie)=a'1*Ie^2+b'1*Ie+c'1$$

Where:

a'1, b'1 and c'1 are constants determined by interpolation;

Csd is the torque obtained at the output of the actuator in the direct direction, Ie is an intensity applied at the input of the actuator, The reproduction of the third and fourth steps of the method according to the first embodiment described above makes it possible to establish the third indirect characteristic interpolated function in the form of a polynomial function of degree 2 which is written in the form $$Csi(Ie) = a'2*Ie^2 + b'2*Ie + c'2$$

Where:

a'2, b'2 and c'2 are constants determined by interpolation;

Csi is the torque obtained at the output of the actuator in the indirect direction, Ie is an intensity applied at the input of the actuator.

According to a fifth step, the value of the control correction coefficient $\lambda$ is established, by performing, using methods known per se, an adjustment of the control coefficient $\lambda$ so as to minimise the following sum of the squares of the deviations between the following sixth and seventh functions:

$$F6(X) = a'2 * X^2 + b'2 * X + c'2 \quad \text{[Math 3]}$$

$$F7(X) = \left(\lambda * i - \alpha^{-1} * \lambda^{-1} * a'1\right) * X + $$
$$0.5 * \alpha^{-1} * \left(i + \alpha^{-1} * \beta * \lambda^{-2} * a'1 - \lambda^{-1} * b'1\right) *$$
$$\left(\sqrt{\beta^2 - 4*\alpha*(\gamma - \lambda*X)} - \beta\right) + \alpha^{-1} * \lambda^{-2} * a'1 * \gamma - c'1 \quad \text{[Math 4]}$$

Where: i is the reduction ratio $\lambda$ is the control input correction coefficient Then, the sixth, seventh and eighth steps described in line with the first embodiment of the invention are reproduced to control the actuation assembly 1.

Naturally, the invention is not limited to the embodiment described.

In particular, although, in this case, the management of the actuation assembly has been described in line with the balancing of a segment, the invention also applies to other management modes such as estimating a contact force or the proportional amplification of a master force measured by a force or torque sensor;

although, in this case, the actuation assembly comprises a current servoamplifier, the invention also applies to other types of current controllers, such as counter-reaction loopless amplifiers, broadband or narrowband linear amplifiers;

although, in this case, the embodiment has been described in line with a single-phase electric motor, the invention also applies in application of other types of motors, like for example, three-phase motors for which the intensity considered to establish direct and indirect characteristics will be the quadratic (or effective) intensity;

although, in this case, the preliminary calibration phase comprises the establishment of a direct and indirect characteristic interpolated based on a series of measurements taken on a second gearbox, the invention also applies to the utilisation of measurements taken on a plurality of second gearboxes to constitute an average result using known statistical methods;

although, in this case, torques are applied on the output and the input of the gearbox using masses and drums, the invention also applies to other means of applying a known torque, like for example, a known mass suspended at the end of an arm of determined length or the application of a resistant motor torque using a calibrated actuator;

although, in this case, the third direct characteristic interpolated function and the fourth indirect characteristic interpolated function have been established by using experimental results, the invention also applies to an interpolation using results provided by the producer of the gearbox;

although, in this case, the method of the invention has been described in line with a rotary output actuation assembly, the invention also applies to a linear output actuation assembly, such as a jack, the first and second output forces applied thus being forces instead of torques;

although, in this case, the plurality of first forces and the plurality of second forces have been applied discretely, the invention also applies to a continuous application of the plurality of first forces and of the plurality of second forces;

although, in this case, the first characteristic interpolated function is a so-called "direct" characteristic function corresponding to an energy transfer from the motor to the charge, the invention also applies to a first characteristic interpolated function corresponding to an energy transfer from the charge to the motor which becomes resistant;

although, in this case, the second characteristic interpolated function is a so-called "indirect" characteristic function, corresponding to an energy transfer from the charge to the motor, the invention also applies to a second characteristic interpolated function corresponding to an energy transfer from the motor to the charge (drive);

although, in this case, the method of the invention has been described in line with a first gearbox comprising a strain wave gearing comprising a closed deformable ring, the invention also applies to other types of first gearboxes comprising a strain wave gearing, the deformable outer ring of which is bell-shaped or flared, even a strip-shaped deformable outer ring comprising a first number of teeth and which is engaged both in a first inner ring of the same number of teeth and in a second inner ring of a second number of teeth, the first inner ring rotating with respect to the second inner ring. The first construction parameters thus also comprise these first additional construction parameters;

although, in this case, mention is made of a first movement direction of the output and of a second movement direction of the output opposite to the first, the invention also applies to the actuation systems comprising a non-reversible gearbox such as a fine thread screw;

although, in this case, the correction of the intensities by the control correction coefficient has been done on the discrete current values measured, the invention also applies to a correction of the intensities by the control correction coefficient done directly on the first and second characteristics;

although, in this case, the characteristic curves have been interpolated by using five operating points, the invention also applies to the interpolation of characteristic curves based on a different number of points, less than or equal to four or greater than five.

The invention claimed is:

1. A method for controlling an electric actuation assembly, comprising a current controller connected to an actuator, the actuator comprising a motor coupled with a gearbox having a known reduction ratio, the actuation assembly being provided with an output, the method comprising the following steps:
- applying a plurality of first known output forces on the output of the actuation assembly and recording using the current controller, a plurality of associated first input intensities to be applied at the input of the actuation assembly to obtain a balance of the actuation assembly in a first direction of the output;
- establishing, by interpolation, a first characteristic function of the actuation assembly linking a controlled intensity at the input of the actuation assembly and a force obtained at the output of the actuation assembly;
- applying a plurality of second known output sources on the output of the actuation assembly and recording, using the current controller, a plurality of associated second input intensities to be applied at the input of the actuation assembly to obtain a balance of the actuation assembly in a second direction of the output opposite to the first direction;
- establishing, by interpolation, a second characteristic function of the actuation assembly linking a controlled current at the input of the actuation assembly and a force obtained at the output of the actuation assembly;
- establishing, on the basis of the first characteristic function of the actuation assembly, the second characteristic function of the actuation assembly of a magnetic constant of the motor and of the reduction ratio of the gearbox, a control correction coefficient intended to be applied by multiplication to a control input value;
- controlling the actuation assembly by applying the control correction coefficient.

2. The method according to claim 1, wherein, the first characteristic function being a linear function which is written in the form $$Csd(Ie)=a1*Ie+b1$$

Where:
a1 and b1 are constants determined by interpolation,
Csd is the force obtained at the output of the actuation assembly for a movement of the output in the first direction,
Ie is an intensity applied at the input of the actuation assembly,
the second characteristic function being a linear function which is written in the form:

$$Csi(Ie)=a2*Ie+b2$$

Where:
a2 and b2 are constants determined by interpolation,
Csi is the force obtained at the output of the actuation assembly for a rotation of the output in the second direction,
Ie is an intensity applied at the input of the actuation assembly,
the step of establishing a control correction coefficient comprises the calculation of the correction coefficient as follows:

$$\lambda = \frac{i^{-1} * \sqrt{B^{-1}*(a1*a2)}}{K} \quad \text{[Math 1]}$$

Where:
B is a skewness coefficient which is calculated as follows:

$$B = \frac{Rd}{Ri} \quad \text{[Math 2]}$$

with
Rd: theoretical yield of the gearbox when the output charge of the gearbox is resistant;
Ri: theoretical yield of the gearbox when the output charge of the gearbox is motive
i is the reduction ratio
K is the electromagnetic constant
$\lambda$ is the control input correction coefficient.

3. The method according to claim 1, wherein, the first gearbox comprising a strain wave gearing defined by first construction parameters which comprise a first deformable outer ring shape, a first number of deformable outer ring teeth, a first toothing profile, a second number of inner ring teeth, the method comprises a preliminary calibration step comprising the following steps:
- selecting a second gearbox defined by second construction parameters identical to the first construction parameters;
- establishing a third characteristic function of the second gearbox linking a force applied at the input of the second gearbox and a force obtained at the output of the second gearbox for a movement of an output of the second gearbox in a third direction;
- establishing a fourth characteristic function of the second gearbox linking a force applied at the input of the second gearbox and a force obtained at the output of the second gearbox for a movement of an output of the second gearbox in a fourth direction opposite to the third direction;
- determining a plurality of pairs of values such that:

$$x1-(1/i)*F3(x1)=F4(x2)-i*x2$$

wherein
x1 is a first abscissa
x2 is a second abscissa
i is the reduction ratio
F3(x1) is the third characteristic function;
F4(x2) is the fourth characteristic function;
interpolating a fifth function for determining the second abscissa according to the first abscissa in the form of a polynomial function of degree 2 being written:

$$x2=\alpha*x1^2+\beta*x1+\gamma,$$

Where $\alpha$, $\beta$ and $\gamma$ are constants determined by interpolation,
the first characteristic function being established in the form of a polynomial function of degree 2 which is written in the form $$Csd(Ie)=a'1*Ie^2+b'1*Ie+c'1$$

Where:
a'1, b'1 and c'1 are constants determined by interpolation;
Csd is the forced obtained at the output of the actuation unit for a movement of the output of the second gearbox in the third direction,
Ie is an intensity applied at the input of the actuator,
the second characteristic function being established in the form of a polynomial function of degree 2 which is written in the form $$Csi(Ie)=a'2*Ie^2+b'2*Ie+c'2$$

Where:
a'2, b'2 and c'2 are constants determined by interpolation;
Csi is the force obtained at the output of the actuation unit for a movement of the output of the second gearbox in the fourth direction,
Ie is a current applied at the input of the actuator,
the step of establishing a control correction coefficient comprises a step of adjusting the control coefficient so as to minimise the following sum of squares of deviations between the sixth and the seventh function:

$$F6(X) = a'2 * X^2 + b'2 * X + c'2 \quad [\text{Math 3}]$$

$$F7(X) = \left(\lambda * i - \alpha^{-1} * \lambda^{-1} * a'1\right) * X + \\ 0.5 * \alpha^{-1} * \left(i + \alpha^{-1} * \beta * \lambda^{-2} * a'1 - \lambda^{-1} * b'1\right) * \\ \left(\sqrt{\beta^2 - 4 * \alpha * (\gamma - \lambda * X)} - \beta\right) + \alpha^{-1} * \lambda^{-2} * a'1 * \gamma - c'1 \quad [\text{Math 4}]$$

Where: i is the reduction ratio
$\lambda$ is the control input correction coefficient.

4. The method according to claim 1, wherein the actuator is a rotary output actuator.

5. The method according to claim 1, wherein the actuator is a linear output actuator.

\* \* \* \* \*